United States Patent
Jonnagadla et al.

(10) Patent No.: US 8,880,621 B2
(45) Date of Patent: *Nov. 4, 2014

(54) LOAD BALANCING IN BROKER-BASED MESSAGING SYSTEMS AND METHODS

(75) Inventors: Suresh S. Jonnagadla, Laurel, MD (US); Shailender Gola, North Potomac, MD (US); Robert G. Daugherty, Los Angeles, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 498 days.

This patent is subject to a terminal disclaimer.

(21) Appl. No.: 12/826,227

(22) Filed: Jun. 29, 2010

(65) Prior Publication Data
US 2011/0320888 A1    Dec. 29, 2011

(51) Int. Cl.
*G06F 15/16* (2006.01)
*G06F 15/173* (2006.01)
*G06F 11/30* (2006.01)
*G06F 9/50* (2006.01)

(52) U.S. Cl.
CPC ............ *G06F 9/5055* (2013.01); *G06F 11/302* (2013.01); *G06F 11/3055* (2013.01); *G06F 9/505* (2013.01)
USPC .......................................... 709/206; 709/226

(58) Field of Classification Search
USPC ................................... 709/201–207
See application file for complete search history.

(56) References Cited

U.S. PATENT DOCUMENTS

| | | | |
|---|---|---|---|
| 7,801,959 B1 * | 9/2010 | Lennie et al. | 709/206 |
| 7,865,559 B1 * | 1/2011 | Day | 709/206 |
| 2001/0039565 A1 * | 11/2001 | Gupta | 709/203 |
| 2001/0047385 A1 * | 11/2001 | Tuatini | 709/203 |
| 2004/0240458 A1 * | 12/2004 | T V et al. | 370/412 |
| 2005/0278410 A1 * | 12/2005 | Espino | 709/201 |
| 2006/0036463 A1 * | 2/2006 | Patrick et al. | 705/1 |
| 2010/0205271 A1 * | 8/2010 | Callaghan | 709/206 |
| 2011/0107136 A1 * | 5/2011 | Jonnagadla et al. | 714/3 |

* cited by examiner

*Primary Examiner* — Yasin Barqadle

(57) ABSTRACT

An exemplary method includes a message broker subsystem receiving a message intended for delivery to a recipient software application instance, determining that the recipient software application instance is included in a plurality of functionally equivalent software application instances that are registered with a global directory service subsystem that is communicatively coupled to the message broker subsystem, automatically selecting a software application instance from the plurality of software application instances for receipt of the message in accordance with a load balancing heuristic, and attempting to deliver the message to the selected software application instance. Corresponding methods and systems are also described.

20 Claims, 13 Drawing Sheets

600

Broker Information Table

| Broker Name | Location IP Address | Location Port Number |
|---|---|---|
| Broker A | 111.191.221.65 | 7123 |
| Broker B | 155.159.211.39 | 4554 |
| Broker C | 122.125.135.145 | 3778 |
| Broker D | 165.167.169.19 | 3434 |

Fig. 6

Software Application Information Table 702

| Software Application Name | Associated Broker Name | Software Application Instances for Load Balancing |
|---|---|---|
| Application 1A | Broker A | 1B, 1C |
| Application 1B | Broker B | |
| Application 1C | Broker C | |
| Application 2A | Broker A | 2B, 2C, 2D |
| Application 2B | Broker B | |
| Application 2C | Broker C | |
| Application 2D | Broker D | |
| Application 4 | Broker D | |
| Application 7B | Broker B | 7C |
| Application 7C | Broker C | |
| Application 9 | Broker A | |
| Application 12B1 | Broker B | 12B2 |
| Application 12B2 | Broker B | |
| Application 13 | Broker A | |

Fig. 7

LOAD BALANCING IN BROKER-BASED MESSAGING SYSTEMS AND METHODS

BACKGROUND INFORMATION

Message-oriented middleware is infrastructure that increases the interoperability, portability, and flexibility of software applications by allowing the software applications to communicate one with another by transmitting messages therebetween. Message-oriented middleware reduces the complexity of developing software applications that span multiple operating systems and network protocols by insulating application developers from the details of the various operating system and network interfaces. Accordingly, software developers can more easily integrate new software applications with existing software applications.

In typical message-oriented middleware configurations, messages are transmitted from one software application to another by way of a message broker. However, in some instances, a particular software application may be overwhelmed by the number of messages that it receives and enter into a fault state in which it may not be able receive messages and/or process them in a timely manner. The fault state may be caused by the sheer volume of messages that the software application receives, inherent resource limitations of the application platform within which the software application resides, and/or for any other reason.

A typical message broker that receives a message intended for a software application that is in a fault state will repeatedly attempt to deliver the message to the software application for a predetermined time interval before determining that the message is undeliverable and returning it to an originating software application, even if the message broker has already failed to deliver other messages to the software application. Such repeated attempts to deliver each message intended for a software application in a fault state can cause undesirable delays, consume valuable network resources, and result in frustrating experiences for end users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 6 shows an exemplary broker information table according to principles disclosed herein.

FIG. 7 shows an exemplary software application information table according to principles disclosed herein.

DETAILED DESCRIPTION OF PREFERRED EMBODIMENTS

Figure 1:
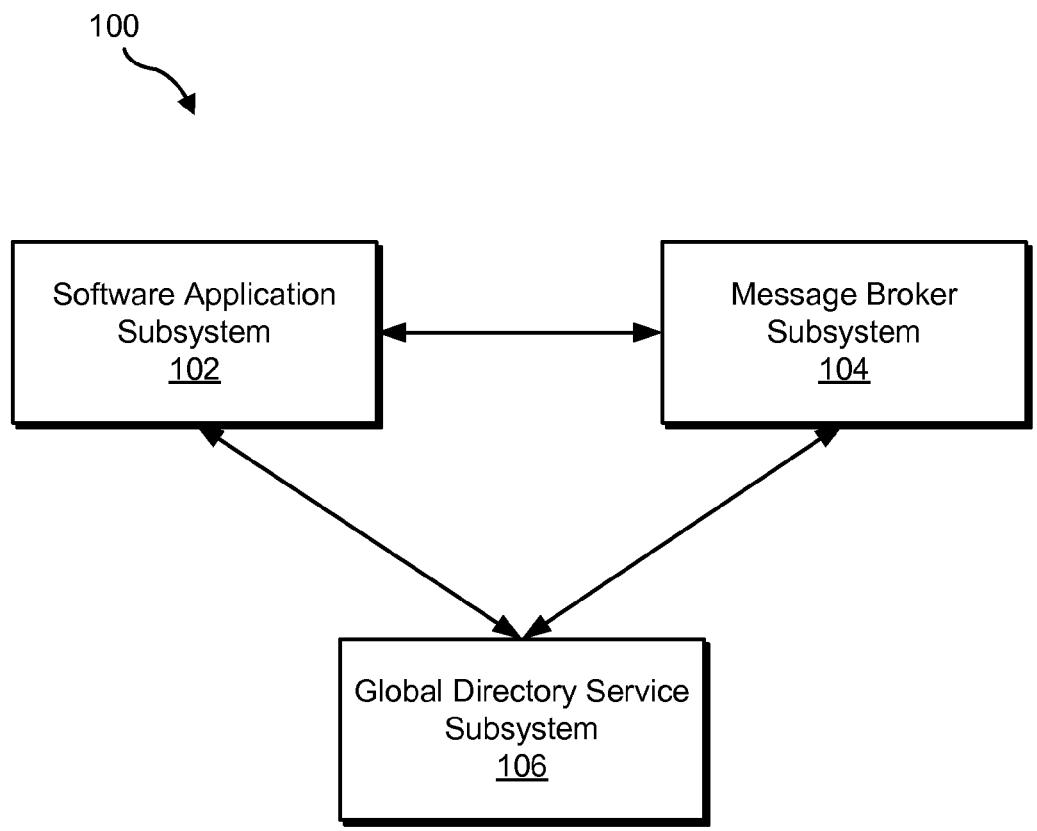
FIG. 1 illustrates an exemplary broker-based messaging system according to principles disclosed herein.

Exemplary methods and systems for load balancing in a broker-based messaging system are described herein. As described in more detail below, a message broker subsystem may receive a message intended for delivery to a recipient software application instance and determine that the recipient software application instance is included in a plurality of functionally equivalent software application instances that are registered with a global directory service subsystem that is communicatively coupled to the message broker subsystem. In response, the message broker subsystem may automatically select a software application instance from the plurality of software application instances for receipt of the message in accordance with a load balancing heuristic and attempt to deliver the message to the selected software application instance. The process may be repeated for subsequent messages intended for delivery to the recipient software application instance. In this manner, the load associated with receiving and processing a plurality of messages may be distributed by the message broker subsystem among a plurality of functionally equivalent software applications, thereby resulting in a more efficient and effective broker-based messaging system.

As used herein, the term "software application" may include, but is not limited to, a software product (e.g., a software program), a module within a software product, and/or any other software component (e.g. an enterprise java bean, a servlet, etc.) as may serve a particular implementation. As used herein, an "originating software application" is one that generates a message to be sent to another software application (referred to herein as a "recipient software application").

In some examples, a plurality of functionally equivalent instances of a software application may be selectively and communicatively coupled to a message broker subsystem. As will be described in more detail below, each software application instance may include a uniquely named stand-alone software application that is functionally equivalent to the other software application instances included in the plurality of software application instances. Hence, the terms "software application" and "software application instance" will be used interchangeably to refer to a software application.

As used herein, a "message" generated by a software application may include any data that may be read or otherwise processed by a message broker subsystem and/or a recipient software application. A message may be transmitted in encrypted form or as cleartext (i.e., non-encrypted form).

A "fault state" refers to a condition or state wherein a recipient software application is unable to receive a message from a message broker subsystem. A recipient software application may be in a fault state for any of a number of different reasons. For example, a recipient software application may be overwhelmed with incoming messages and/or include one or more glitches, bugs, or other problems that cause the recipient software application to be in a fault state. Additionally or alternatively, a recipient software application may be in a fault state while stuck in a database lookup or otherwise overloaded. Additionally or alternatively, a fault state may be caused by a resource drain on a computing device that is executing the recipient software application and/or a disabled, delayed, or otherwise faulty network connection between the recipient software application and the message broker subsystem. A fault state of a recipient software application may be temporary (e.g., only a few seconds) or more permanent (e.g., until fixed by a software developer).

FIG. 1 illustrates an exemplary broker-based messaging system 100 (or simply "system 100"). As shown in FIG. 1, system 100 may include a software application subsystem 102, a message broker subsystem 104, and a global directory service subsystem 106 configured to communicate with one another. Software application subsystem 102 may be configured to maintain and/or execute a plurality of software applications, some of which may be functionally equivalent to one another. Message broker subsystem 104 may be configured to function as message-oriented middleware and facilitate delivery of one or more messages generated by one or more originating software applications to one or more recipient software applications. Global directory service subsystem 106 may be configured to maintain registration data associated with the software applications and message broker subsystem 104. As will be described in more detail below, system 100 may facilitate load balancing among a plurality of functionally equivalent software application instances.

Software application subsystem 102, message broker subsystem 104, and global directory service subsystem 106 may communicate using any communication platforms and technologies suitable for transporting data, including known communication technologies, devices, media, and protocols supportive of remote or local data communications. Examples of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Ethernet, and any other suitable communications technologies, devices, media, and protocols.

In some examples, software application subsystem 102, message broker subsystem 104, and global directory service subsystem 106 may communicate via one or more networks, including, but not limited to, wireless networks, broadband networks, closed media networks, cable networks, satellite networks, the Internet, intranets, local area networks, public networks, private networks, optical fiber networks, and/or any other networks capable of carrying data and communications signals between software application subsystem 102, message broker subsystem 104, and global directory service subsystem 106.

Figure 2:
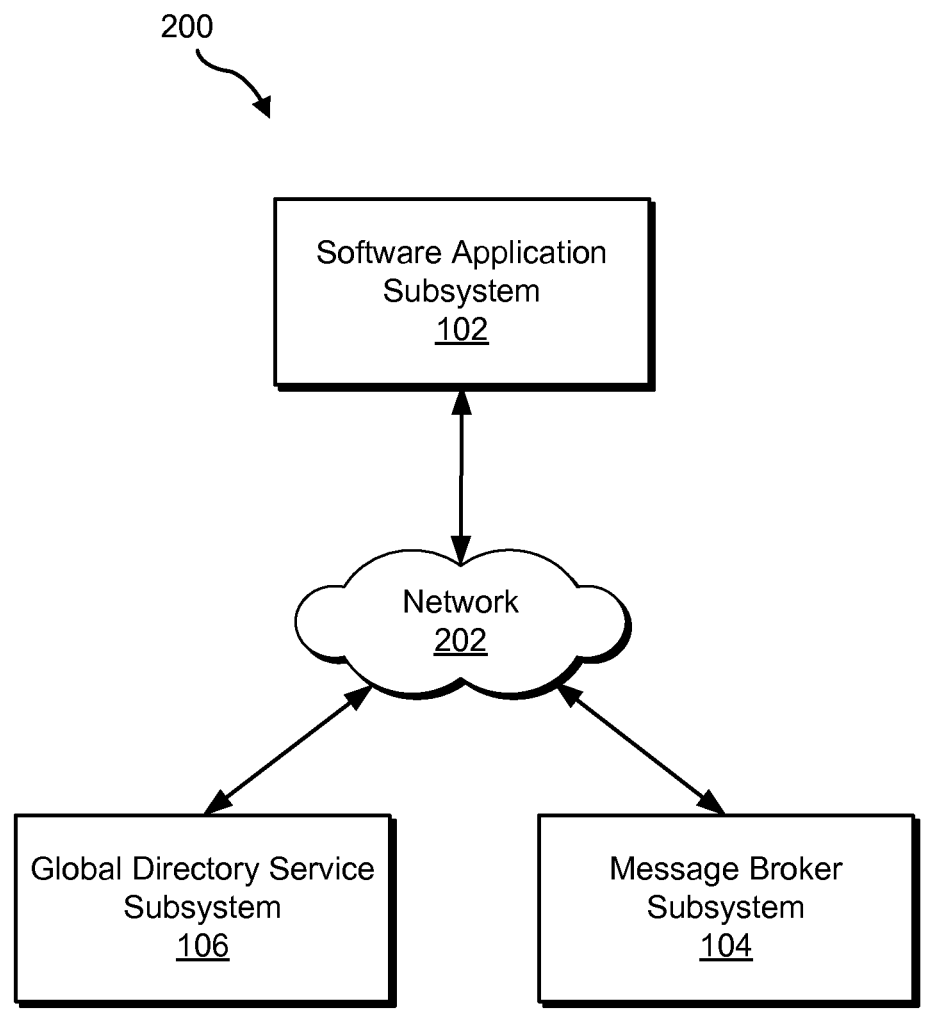
FIG. 2 shows an exemplary implementation of the system of FIG. 1 according to principles disclosed herein.

FIG. 2 shows an exemplary implementation 200 of system 100 wherein software application subsystem 102, message broker subsystem 104, and global directory service subsystem 106 are communicatively coupled via a network 202. Network 202 may include one or more networks, including, but not limited to, any of the networks listed above. Communications between software application subsystem 102, message broker subsystem 104, and global directory service subsystem 106 may be transported using any one of above-listed networks, or any combination or sub-combination of the above-listed networks. In some examples, software application subsystem 102, message broker subsystem 104, and/or global directory service subsystem 106 may be implemented at least in part by one or more servers or other network-enabled devices.

Software application subsystem 102, message broker subsystem 104, and global directory service subsystem 106 may each be implemented by one or more computing devices. For example, software application subsystem 102 may be implemented by a first computing device configured to execute an originating software application and a second computing device configured to execute a recipient software application. Alternatively, software application subsystem 102 may be implemented by a single computing device configured to execute both the originating and recipient software applications.

In some examples, software application subsystem 102, message broker subsystem 104, and global directory service subsystem 106 are implemented by distinct computing devices. Alternatively, subsystems 102-106 may be implemented by the same computing device. Any other implementation of subsystems 102-106 may be realized in accordance with the systems and methods described herein.

Figure 3:
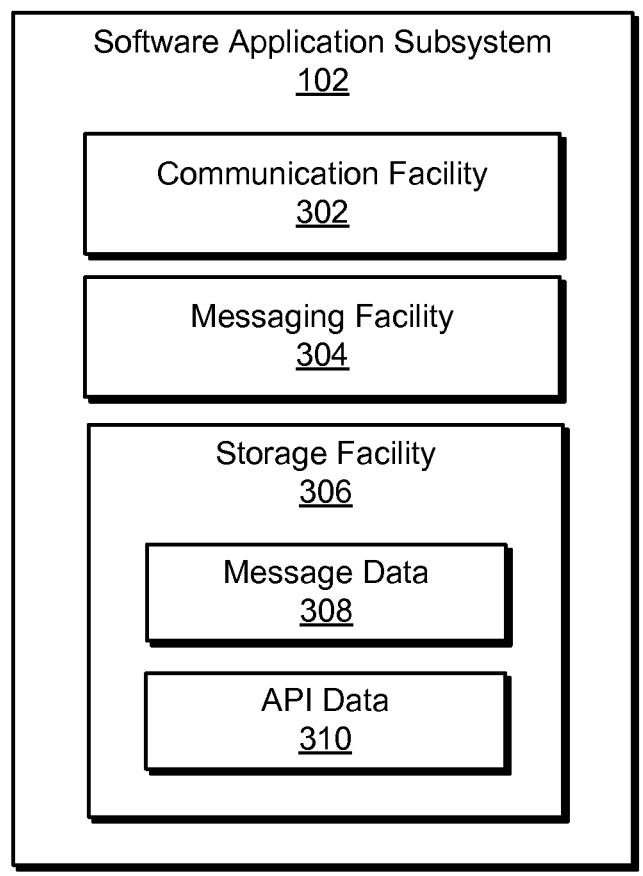
FIG. 3 illustrates exemplary components of a software application subsystem according to principles disclosed herein.

FIG. 3 illustrates exemplary components of software application subsystem 102. As shown in FIG. 3, software application subsystem 102 may include a communication facility 302, a messaging facility 304, and a storage facility 306, which may be in communication with one another using any suitable communication technologies.

Communication facility 302 may be configured to facilitate communication between software application subsystem 102 and message broker subsystem 104. For example, communication facility 302 may be configured to establish and/or assist in establishing one or more connections between software application subsystem 102 and message broker subsystem 104 over which one or more messages may be transmitted from software application subsystem 102 to message broker subsystem 104 and/or from message broker subsystem 104 to software application subsystem 102. The one or more connections established between software application subsystem 102 and message broker subsystem 104 may include one or more secure connections and/or one or more non-secure connection. An exemplary secure connection includes, but is not limited to, a secure sockets layer ("SSL") connection. An exemplary non-secure connection includes, but is not limited to, a non-SSL connection.

Communication facility 302 may additionally or alternatively be configured to facilitate communication between software application subsystem 102 and global directory service subsystem 106. For example, communication facility 302 may be configured to transmit registration data to global directory service subsystem 106 to register one or more software applications with global directory service subsystem 106.

Messaging facility 304 may be configured to process a message generated by an originating software application and/or a message received by a recipient software application. Exemplary, but not exclusive, processing of a message that may be performed by messaging facility 304 includes encrypting a message, decrypting a message, preparing a message for transmission to a recipient software application via message broker subsystem 104, processing of a message received from message broker subsystem 104, etc.

Storage facility 306 may be configured to maintain message data 308 and application programming interface ("API") data 310. It will be recognized that storage facility 306 may maintain additional or alternative data as may serve a particular implementation.

Message data 308 may include data representative of one or more messages generated and/or received by a software application. Message data 308 may additionally include delivery instructions corresponding to one or more messages.

For example, message data 308 may include an identifier (e.g., a name or identification number) of an intended recipient software application and/or computing device that executes the recipient software application.

API data 310 is representative of one or more APIs configured to facilitate integration of one or more software applications executed by software application subsystem 102 with message broker subsystem 104 and/or global directory service subsystem 106. For example, one or more APIs may interface with one or more software applications executed by application subsystem 102 to facilitate encryption of messages generated by the one or more software applications, communication with message broker subsystem 104 and/or global directory service subsystem 106, and/or any other feature as may serve a particular implementation.

Figure 4:
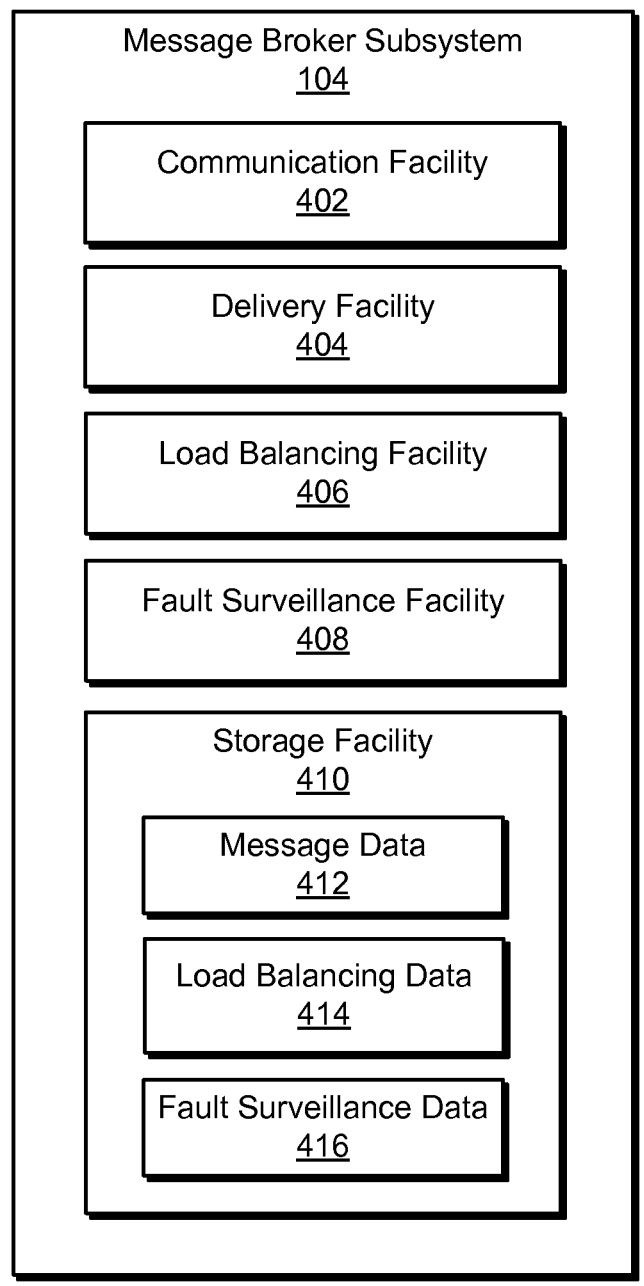
FIG. 4 illustrates exemplary components of a message broker subsystem according to principles disclosed herein.

FIG. 4 illustrates exemplary components of message broker subsystem 104. As shown in FIG. 4, message broker subsystem 104 may include a communication facility 402, a delivery facility 404, a load balancing facility 406, a fault surveillance facility 408, and a storage facility 410, which may be in communication with one another using any suitable communication technologies.

Communication facility 402 may be configured to facilitate communication between message broker subsystem 104 and software application subsystem 102. For example, communication facility 402 may be configured to establish and/or assist in establishing one or more connections between message broker subsystem 104 and software application subsystem 102 over which one or more messages may be transmitted from software application subsystem 102 to message broker subsystem 104 and/or from message broker subsystem 104 to software application subsystem 102. In some examples, communication facility 104 may be configured to receive a message intended for delivery to a recipient software application by way of one of the established one or more connections.

Communication facility 402 may additionally or alternatively be configured to facilitate communication between message broker subsystem 104 and global directory service subsystem 106. For example, communication facility 402 may be configured to transmit data representative of a request for load balancing instructions associated with a particular recipient software application and/or any other data to global directory service subsystem 106 as may serve a particular implementation.

Delivery facility 404 may be configured to deliver (and/or attempt to deliver) one or more messages received from one or more originating software applications to one or more recipient software applications in accordance with delivery instructions included within the message(s). To this end, delivery facility 404 may be configured to utilize one or more connections established by communication facility 402.

Load balancing facility 406 may be configured to balance delivery of a plurality of messages intended for a particular recipient software application across a plurality of instances of the recipient software application. For example, communication facility 402 may receive a plurality of messages intended for delivery to a recipient software application instance. Load balancing facility 406 may determine that the recipient software application instance is included in a plurality of functionally equivalent software application instances that are registered with global directory service subsystem 106. As will be described in more detail below, load balancing facility 406 may determine that the recipient software application instance is included in the plurality of functionally equivalent software application instances by querying global directory service subsystem 106. Alternatively, load balancing facility 406 may determine that the recipient software application instance is included in the plurality of functionally equivalent software application instances by accessing load balancing data 414 already cached in storage facility 410.

In response to the determination, load balancing facility 406 may direct delivery facility 404 to selectively distribute the messages among the plurality of software application instances in accordance with a load balancing heuristic. For example, with respect to each successive message included in the plurality of messages, load balancing facility 406 may automatically select a different software application instance from the plurality of software application instances for receipt of the message and direct delivery facility 404 to attempt to deliver the message to the selected software application instance. The load balancing heuristic may be performed in a round-robin manner (i.e., by rotating through the available software application instances in a specified order) and/or in any other manner as may serve a particular implementation. For example, some software application instances may be given selection priority over others in accordance with one or more factors as may serve a particular implementation. However, for illustrative purposes, the load balancing heuristic is performed in a round-robin manner in the examples given herein.

Fault surveillance facility 408 may be configured to monitor an availability status of one or more recipient software application instances. For example, fault surveillance facility 408 may identify that a particular recipient software application instance is unavailable (e.g., in a fault state) and prevent the identified recipient software application instance from being selected for receipt of a message in accordance with a load balancing heuristic during a predetermined time period.

Fault surveillance facility 408 may identify software application instances in a fault state in any suitable manner as may serve a particular implementation. For example, fault surveillance facility 408 may monitor whether delivery facility 404 is able to successfully deliver a message to a recipient software application instance. If delivery facility 404 fails to deliver the message, fault surveillance facility 408 may determine that the recipient software application is in a fault state. Additionally or alternatively, fault surveillance facility 408 may determine that a software application instance is in a fault state by receiving a notification from the recipient software application instance indicative of the fault state, monitoring a performance of the recipient software application instance, and/or in any other manner as may serve a particular implementation.

In some examples, fault surveillance facility 408 may detect a failure by delivery facility 404 to deliver a message to a software application instance selected in accordance with a load balancing heuristic. In response, load balancing facility 406 may automatically select another software application instance functionally equivalent to the originally selected software application instance for receipt of the message in accordance with the load balancing heuristic and direct delivery facility 404 to attempt to deliver the message to the newly selected software application instance. The newly selected software application instance may be selected in accordance with the same load balancing heuristic used to originally select the unavailable software application.

In some examples, delivery facility 404 may successfully deliver a message to a selected software application instance. Fault surveillance facility 408 may detect the successful delivery and notify a software application that originated the message of the successful delivery. Alternatively, delivery facility 404 may fail to deliver a message to each available instance of a recipient software application. In response, fault surveillance facility 408 may notify the software application that originated the message of the failure to deliver the message. For example, the message may be returned to the originating software application by delivery facility 404.

Storage facility 410 may be configured to maintain message data 412 representative of one or more messages to be delivered to a recipient software application, load balancing data 414 representative of data utilized by load balancing facility 406, and fault surveillance data 416 representative of data utilized by fault surveillance facility 408 (e.g., data identifying one or more software application instances in a fault state). Storage facility 410 may maintain additional or alternative data as may serve a particular implementation.

Figure 5:
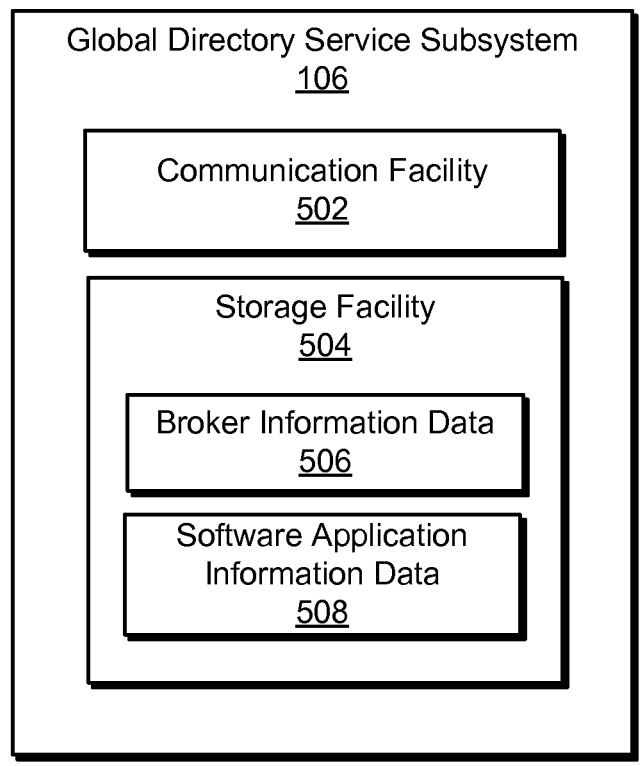
FIG. 5 illustrates exemplary components of a global directory service subsystem according to principles disclosed herein.

FIG. 5 illustrates exemplary components of global directory service subsystem 106. As shown in FIG. 5, global directory service subsystem 106 may include a communication facility 502 and a storage facility 504, which may be in communication with one another using any suitable communication technologies. As will be described in more detail below, software application subsystem 102 and message broker subsystem 104 may register with global directory service subsystem 106 so that message broker subsystem 104 may be able to determine how and where to deliver messages to one or more recipient software application instances.

Communication facility 502 may be configured to facilitate communication between global directory service subsystem 106 and software application subsystem 102. Communication facility 502 may be further configured to facilitate communication between global directory service subsystem 106 and message broker subsystem 104.

Storage facility 504 may be configured to maintain broker information data 506, software application information data 508, and/or any other data as may serve a particular implementation.

Broker information data 506 may include information descriptive of or otherwise corresponding to message broker subsystem 104. For example, broker information data 506 may include a list of broker names and corresponding IP addresses and location port numbers. Broker information data 506 may be registered dynamically and/or statically as may serve a particular implementation.

FIG. 6 shows an exemplary broker information table 600 comprising broker information data that may be maintained by global directory service subsystem 106. The broker information data may be maintained in the form of a look-up table, for example.

As shown in FIG. 6, broker information table 600 may include a list of broker names, location IP addresses, and location port numbers associated with each of a plurality of message brokers implementing message broker subsystem 104. The information included within broker information table 600 may be accessed by one or more message brokers and/or software applications to determine appropriate delivery instructions for messages to be transmitted from one software application to another.

Returning to FIG. 5, software application information data 508 may include information descriptive of or otherwise corresponding to one or more software applications. For example, software application information data 508 may include a list of software application names, associated broker names, and load balancing data associated with one or more software applications (e.g., data identifying one or more functionally equivalent instances of one or more software applications). Software application information data 508 may be registered dynamically and/or statically as may serve a particular implementation. For example, software application information data 508 may be periodically updated (e.g., nightly).

FIG. 7 shows an exemplary software application information table 700 (or simply "table 700") comprising software application information data that may be maintained by global directory service subsystem 106. As shown in FIG. 7, table 700 may include a list of names of each of a plurality of software applications. In some examples, each software application has a unique name. For example, the first software application listed in table 700 is named "application 1A." Table 700 may further include the name of a message broker that is associated with each of the software applications listed in table 700. For example, table 700 shows that application 1A is associated with a message broker named "broker A", application 1B is associated with message a message broker named "broker B", etc.

Table 700 may further include load balancing instructions, including data identifying functionally equivalent instances of one or more of the software applications listed in table 700. For example, column 702 of table 700 indicates that applications 1B and 1C are functionally equivalent instances of application 1A. In some examples, an order in which the functionally equivalent software applications are listed in column 702 may specify an order in which message broker subsystem 104 attempts to deliver messages intended for a particular software application. For example, message broker subsystem 104 may rotate through applications 1A, 1B, and 1C, in that order, when attempting to deliver messages intended for application 1A.

Figure 8:
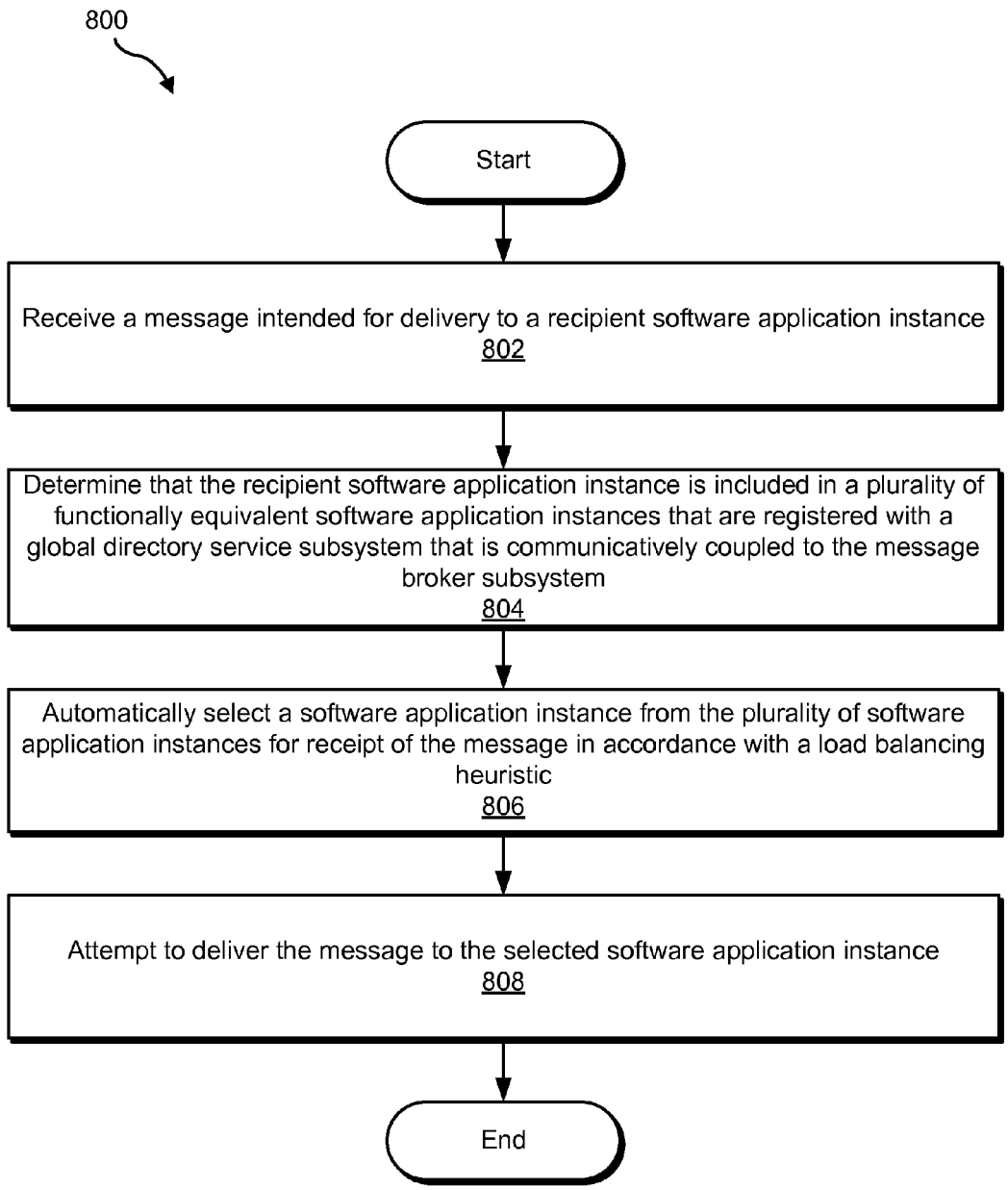
FIG. 8 illustrates an exemplary broker-based messaging method according to principles disclosed herein.

FIG. 8 illustrates an exemplary broker-based messaging method 800 that includes load balancing. While FIG. 8 illustrates exemplary steps according to one embodiment, other embodiments may omit, add to, reorder, and/or modify any of the steps shown in FIG. 8. One or more steps of method 800 may be performed by message broker subsystem 104 and/or any facility, component, or device thereof.

In step 802, a message intended for delivery to a recipient software application instance is received by a message broker subsystem (e.g., message broker subsystem 104). The message may be received by the message broker subsystem in any suitable manner as may serve a particular implementation.

In step 804, the message broker subsystem determines that the recipient software application instance is included in a plurality of functionally equivalent software application instances that are registered with a global directory service subsystem that is communicatively coupled to the message broker subsystem. The determination may be made in any of the ways described herein.

In step 806, the message broker subsystem automatically selects a software application instance from the plurality of software application instances for receipt of the message in accordance with a load balancing heuristic. An exemplary load balancing heuristic will be described in more detail below.

In step 808, the message broker subsystem attempts to deliver the message to the selected software application instance. The message broker subsystem may attempt to deliver the message in any of the ways described herein.

Figure 9:
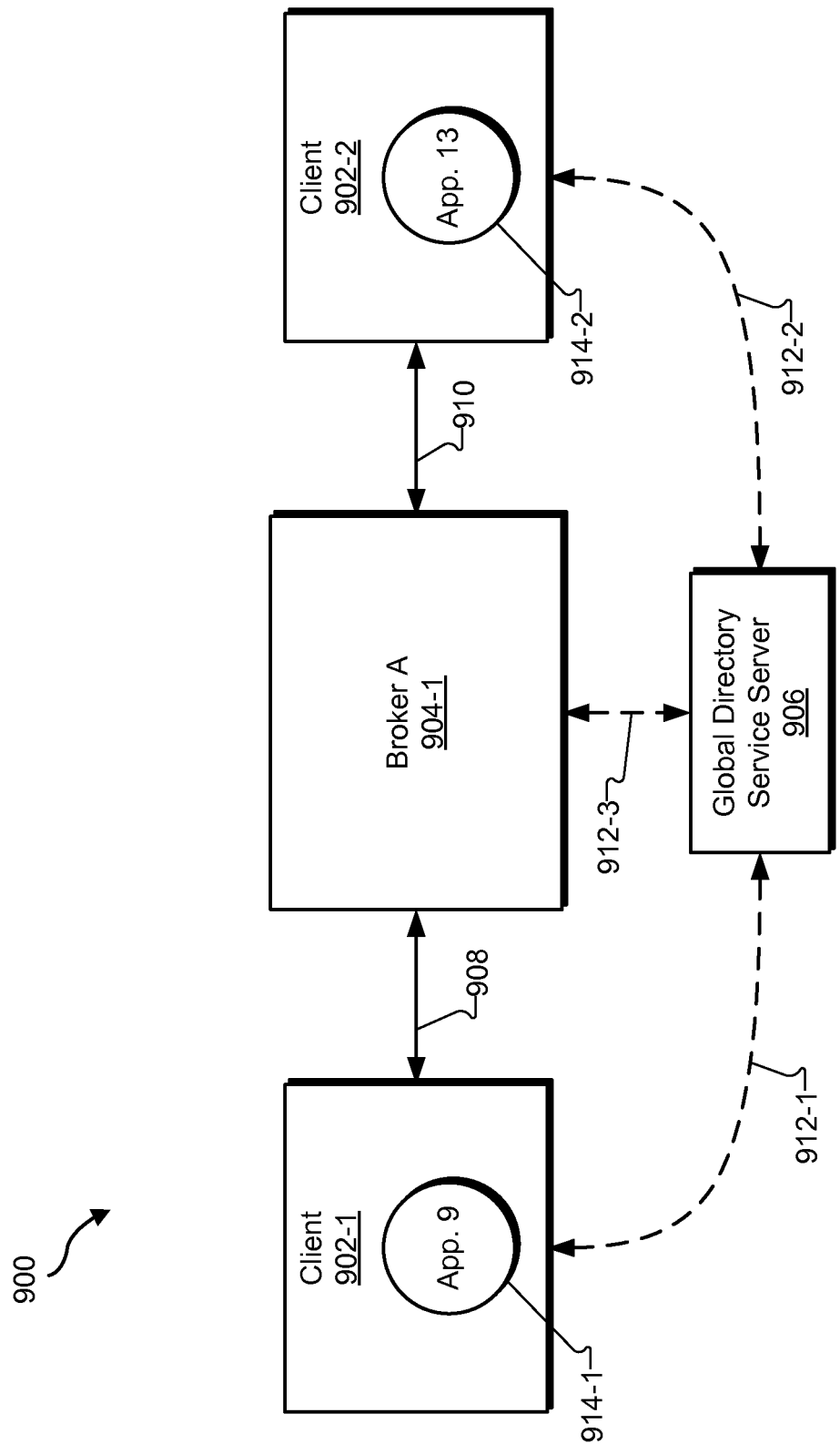
FIG. 9 illustrates another exemplary implementation of the system of FIG. 1 according to principles disclosed herein.
Figure 10:
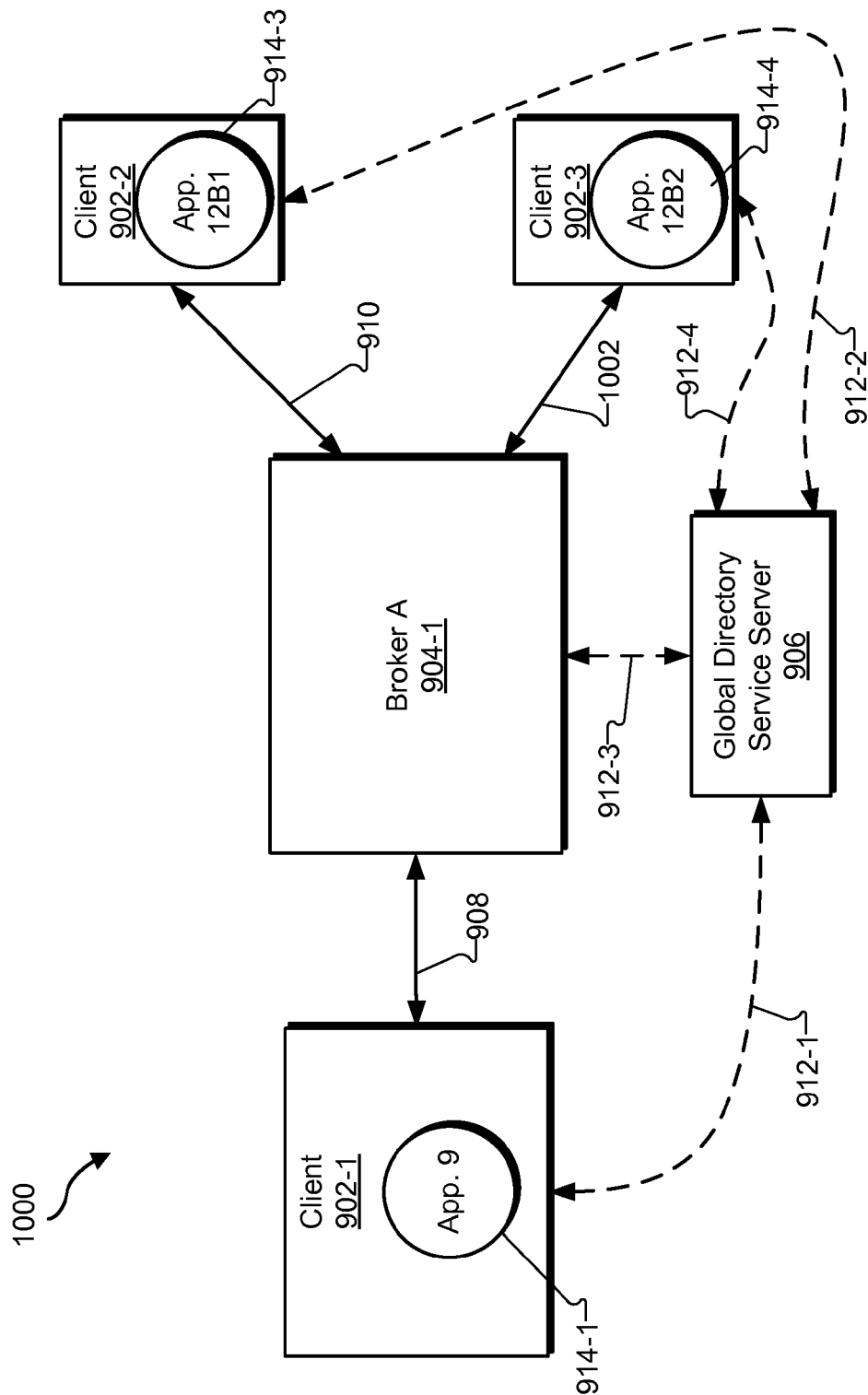
FIG. 10 illustrates another exemplary implementation of the system of FIG. 1 according to principles disclosed herein.
Figure 11:
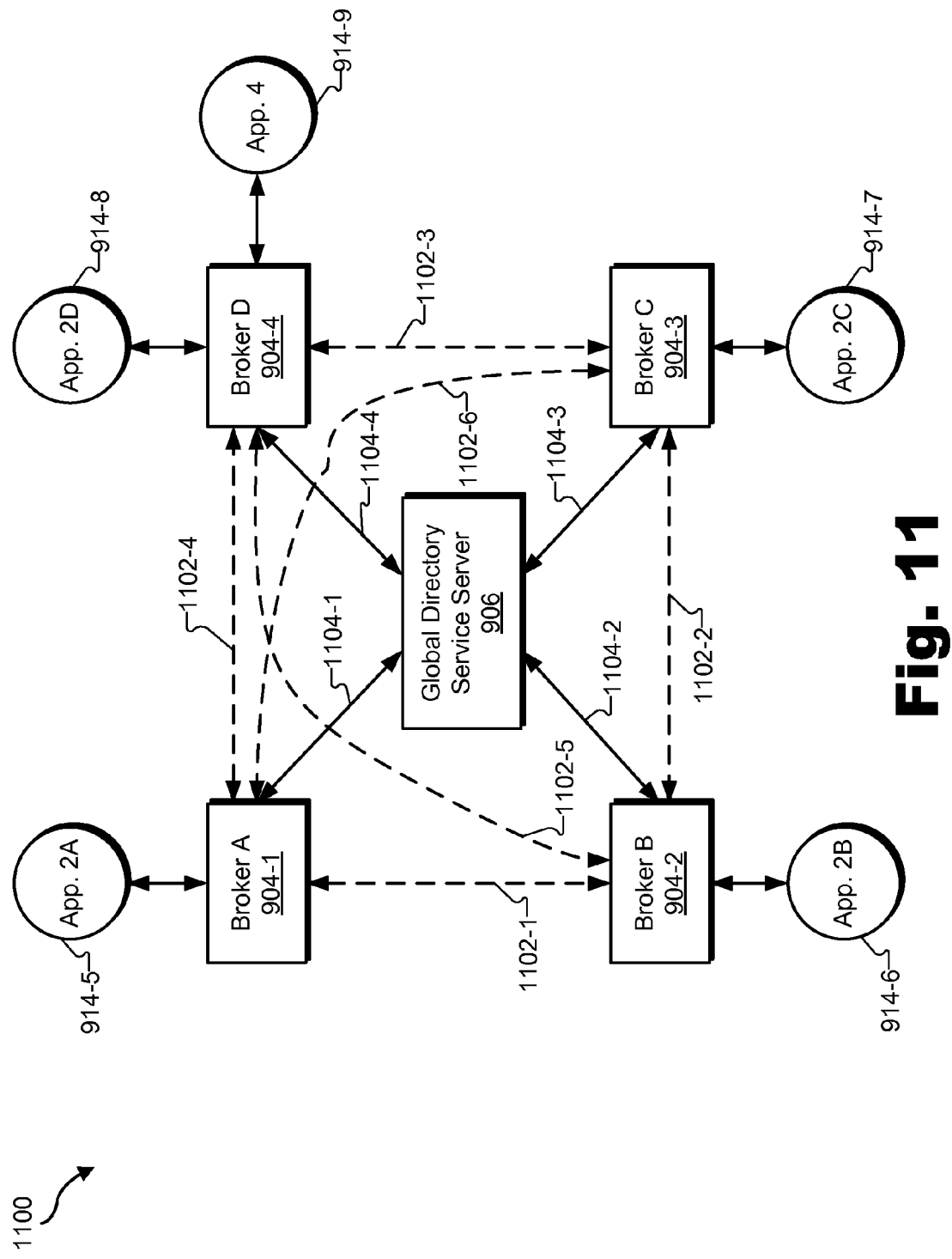
FIG. 11 illustrates another exemplary implementation of the system of FIG. 1 according to principles disclosed herein.

Specific implementations and examples of the load balancing systems and methods described herein will now be described in connection with FIGS. 9-11. It will be recognized that the implementations and examples described in connection with FIGS. 9-11 are merely illustrative of the many possible implementations and examples of the systems and methods described herein. Each of the message brokers and software applications depicted in FIGS. 9-11 correspond to the message brokers and software applications listed in software application information table 700.

FIG. 9 shows an exemplary implementation 900 of system 100 wherein clients 902-1 and 902-2 (collectively referred to herein as "clients 902"), a message broker 904-1 named "broker A" in table 700, and a global directory service server 906 may be communicatively coupled one to another. Software application subsystem 102 may be implemented by clients 902, message broker subsystem 104 may be implemented by message broker 904-1, and global directory service subsystem 106 may be implemented by global directory service server 906. Client 902-1 may be communicatively coupled to message broker 904-1 by way of a connection 908, and client 902-2 may be communicatively coupled to message broker 904-1 by way of a connection 910. Global directory services server 906 may be communicatively coupled to client 902-1, client 902-2, and message broker 904-1 by way of connections 912-1, 912-2, and 912-3, respectively. Each of the connections shown in FIG. 9 may include a TCP/IP connection or any other suitable connection as may serve a particular implementation.

As shown in FIG. 9, client 902-1 may be configured to execute a software application 914-1 named "application 9" in table 700. Software application 914-1 may reside within client 902-1, as depicted in FIG. 9, or may be located within any other subsystem or device. Software application 914-1 may be configured to generate a message that is to be transmitted to another software application 914-2 named "application 13" in table 700. Software application 914-2 may be executed by and/or reside within client 902-2. Hence, software application 914-1 may be referred to as an originating software application and software application 914-2 may be referred to as a recipient software application.

Configuring both software applications 914-1 and 914-2 (collectively "software applications 914") to interface directly one with another may be costly, difficult, cumbersome, and sometimes impossible. Hence, messages may be transmitted between software applications 914 via message broker 904-1, which is configured to interface with both software applications 914. To this end, client 902-1 may be configured to selectively establish connection 908 with the message broker 904-1. Message broker 904-1 may in turn selectively establish connection 910 with client 902-2. A message generated by originating software application 914-1 may be transmitted to message broker 904-1 by way of connection 908. Message broker 904-1 may deliver the message to recipient software application 914-2 by way of connection 910.

It is often desirable to deliver multiple messages to a recipient software application. For example, it may be desirable for message broker 904-1 to deliver multiple messages to software application 914-2. Message broker 904-1 may therefore determine whether one or more functionally equivalent instances of software application 914-2 are registered with global directory service server 906 among which the multiple messages may be distributed in accordance with a load balancing heuristic.

To this end, message broker 904-1 may query directory service server 906, which may maintain data representative of software application information table 700, in order to determine whether software application 914-2 is included in a plurality of functionally equivalent software application instances that are registered with global directory service server 906. In the example of FIG. 9, table 700 indicates that there are no functionally equivalent software application instances of software application 914-2. Hence, message broker 904-1 may attempt to deliver each of the plurality of messages to software application 914-2 and return those messages that are unsuccessfully delivered back to software application 914-1.

FIG. 10 illustrates another exemplary implementation 1000 of system 100. As shown in FIG. 10, implementation 1000 is similar to implementation 900 shown in FIG. 9, except that in FIG. 10 client 902-2 is configured to execute a software application 914-3 named "application 12B1" in table 700 and an additional client 902-3 is communicatively coupled to message broker 904-1 by way of a connection 1002 and to global directory service server 906 by way of a connection 912-4. Client 902-3 is configured to execute a software application 914-4 named "application 12B2" in table 700. As indicated in table 700, software applications 914-3 and 914-4 are functionally equivalent one to another.

In some examples, message broker 904-1 may receive a plurality of messages from software application 914-1 that are intended for software application 914-3. Message broker 904-1 may query global directory service server 906 for load balancing instructions, determine that functionally equivalent software application 914-4 is also registered with global directory service server 906, and distribute the messages among software applications 914-3 and 914-4 in accordance with a load balancing heuristic. For example, the messages may be delivered in an alternating manner to software applications 914-3 and 914-4 (i.e., the first message is delivered to software application 914-3, the second message is delivered to software application 914-4, the third message is delivered to software application 914-3, etc.).

In some examples, the load balancing instructions obtained by message broker 904-1 from global directory service server 906 may be locally cached by message broker 904-1 so that message broker 904-1 may avoid querying global directory service server 906 each time a message intended for recipient software application 914-3 is processed by message broker 904-1. Message broker 904-1 may be configured to periodically re-query global directory service server 906 for the load balancing instructions in the event that the load balancing instructions change.

If either software application 914-3 or software application 914-4 becomes unavailable (e.g., enters a fault state), message broker 904-1 may be configured to cease attempting to deliver messages to the unavailable software application and instead attempt to deliver all of the messages to the available software application. Once the unavailable software application becomes available again, message broker 904-1 may resume delivering the messages to software applications 914-3 and 914-4 in an alternating manner.

FIG. 11 illustrates another exemplary implementation 1100 of system 100 wherein message broker subsystem 104 includes multiple message brokers 904 (e.g., message broker 904-1, a message broker 904-2 named "broker B" in table 700, a message broker 904-3 named "broker C" in table 700, and a message broker 904-4 named "broker D" in table 700) configured to communicate one with another by way of connections 1102 (e.g., connections 1102-1 through 1102-6). Each message broker 904 may also be configured to communicate with global directory service server 906 by way of connections 1104 (e.g., connections 1104-1 through 1104-4).

Each message broker 904 may be associated with one or more software applications 914. For example, message broker 904-1 is associated with a software application 914-5 named "application 2A" in table 700, message broker 904-2 is associated with a software application 914-6 named "application 2B" in table 700, message broker 904-3 is associated with a software application 914-7 named "application 2C" in table 700, and message broker 904-4 is associated with a software application 914-8 named "application 2D" and a software application 914-9 named "application 4" in table 700. As indicated in table 700, software applications 914-5 through 914-8 are functionally equivalent one to another.

Though not illustrated specifically in FIG. 11, the software applications 914 shown in FIG. 11 may each reside within and/or be executed by one or more clients. For example, software application 914-5 may be executed by a first client, software application 914-6 may be executed by a second client, etc.

In some examples, message broker 904-4 may receive a message from software application 914-9 intended for software application 914-5. Message broker 904-4 may first query global directory service server 906 to determine whether software application 914-5 is registered with global directory service server 906. In response, global directory service server 906 may inform message broker 904-4 that software application 914-5 is a registered application and that it is associated with message broker 904-1 in accordance with software application information table 700. Global directory service server 906 may also inform message broker 904-4 that functionally equivalent software application instances of software application 914-5 (e.g., software applications 914-6, 914-7, and 914-8) are also registered with global directory service server 906.

With this information, message broker 904-4 may deliver the message and any subsequent messages intended for software application 914-5 to software applications 904-5 through 904-8 in accordance with a load balancing heuristic. To illustrate, message broker 904-4 may establish a connection with message broker 904-1 (if it does not already exist) and transmit the message to message broker 904-1. Message broker 904-1 may then attempt to deliver the message to software application 914-5. Message broker 904-1 may notify message broker 904-4 regarding the success or failure of the delivery of the message to software application 914-5. If the delivery attempt fails, message broker 904-4 may attempt to deliver the message to software application 914-6 by way of message broker 904-2, then to software application 914-7 by way of message broker 904-3, and then to software application 914-8 by way of message broker 904-4 until the message is successfully delivered. If the message cannot be successfully delivered to any of software applications 904-5 through 904-8, message broker 904-4 may return the message to the originating software application 914-9.

In some examples, if a second message intended for software application 904-5 is received by message broker 904-4, message broker 904-4 may initially attempt to deliver the second message to software application 914-6. If the delivery of the message fails, message broker 904-4 may attempt to deliver the second message to software application 914-7, then to software application 914-8, and then to software application 914-5 until the message is successfully delivered. This round-robin pattern may be followed for subsequent messages intended for software application 914-5 with message broker 904-4 initially attempting to deliver a third message intended for software application 914-5 to software application 914-7, a fourth message intended for software application 914-5 to software application 914-8, a fifth message intended for software application 914-5 to software application 914-5 itself, etc.

Figure 12:
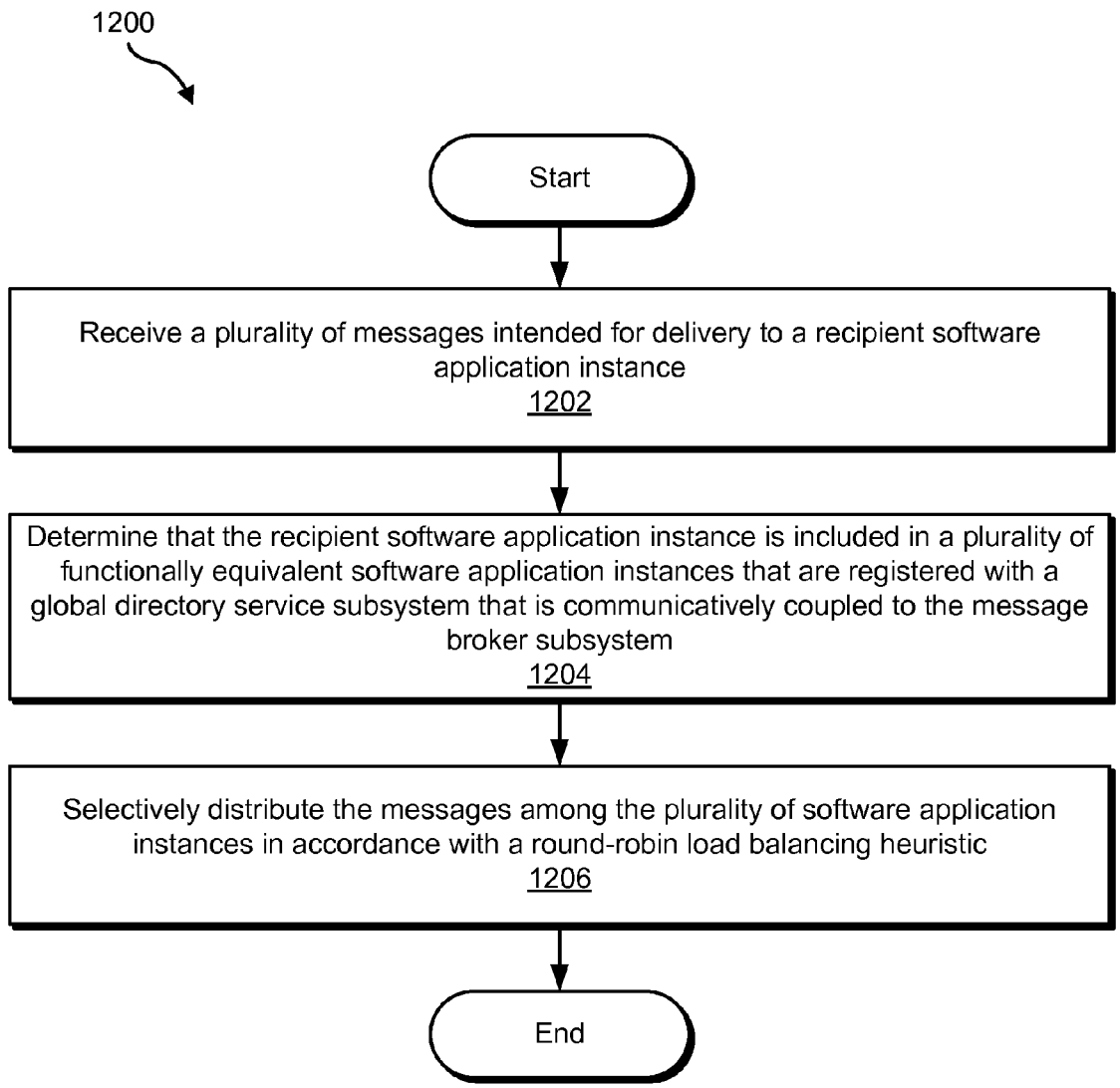
FIG. 12 illustrates another exemplary broker-based messaging method according to principles disclosed herein.

FIG. 12 illustrates an exemplary broker-based messaging method 1200 that includes load balancing. While FIG. 12 illustrates exemplary steps according to one embodiment, other embodiments may omit, add to, reorder, and/or modify any of the steps shown in FIG. 12. One or more steps of method 1200 may be performed by message broker subsystem 104 and/or any facility, component, or device thereof.

In step 1202, a plurality of messages intended for delivery to a recipient software application instance is received by a message broker subsystem (e.g., message broker subsystem 104). The message may be received by the message broker subsystem in any suitable manner as may serve a particular implementation.

In step 1204, the message broker subsystem determines that the recipient software application instance is included in a plurality of functionally equivalent software application instances that are registered with a global directory service subsystem that is communicatively coupled to the message broker subsystem. The determination may be made in any of the ways described herein.

In step 1206, the message broker subsystem selectively distributes the messages among the plurality of software application instances in accordance with a round-robin load balancing heuristic. The selective distribution may be performed in any of the ways described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on a non-transitory computer-readable medium configured to perform one or more of the processes described herein. In particular, system components may be implemented by one physical computing device or may be implemented by more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 13:
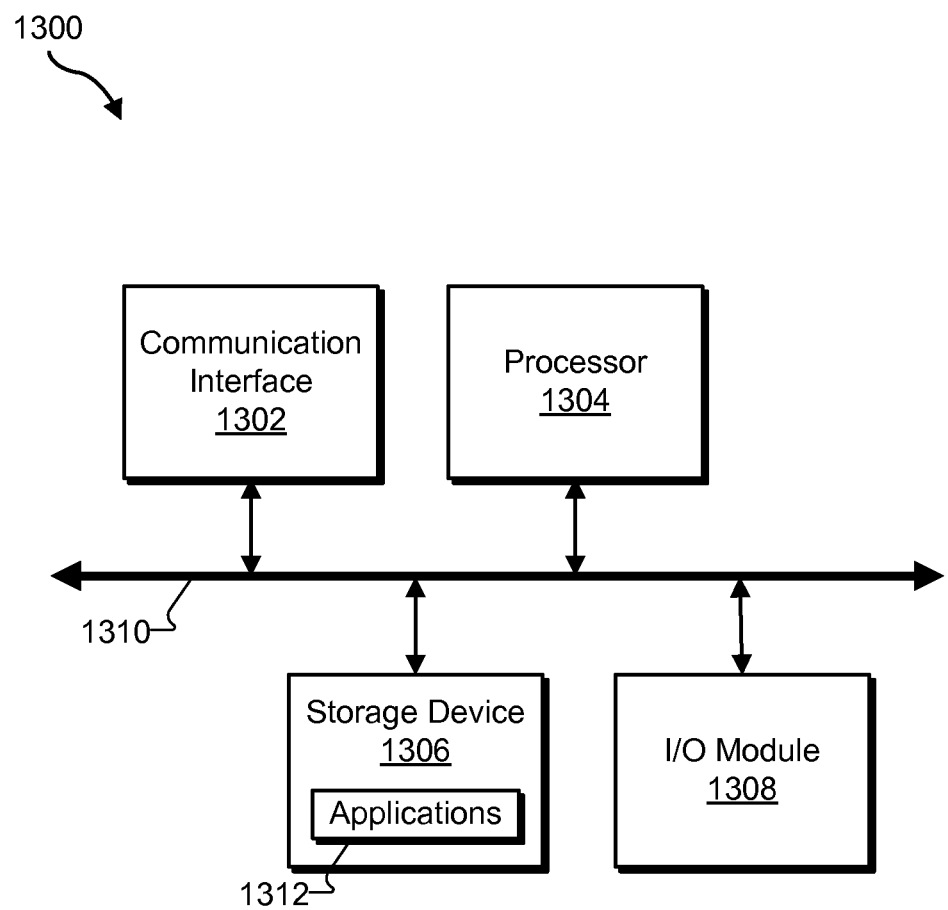
FIG. 13 illustrates an exemplary computing device according to principles disclosed herein.

FIG. 13 illustrates an exemplary computing device 1300 that may be configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, and any other suitable interface. Communication interface 1302 may additionally or alternatively provide such a connection through, for example, a local area network (such as an Ethernet network), a personal area network, a telephone or cable network, a satellite data connection, a dedicated URL, or any other suitable connection. Communication interface 1302 may be configured to interface with any suitable communication media, protocols, and formats, including any of those mentioned above.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another non-transitory computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1306. For example, data representative of one or more executable applications 1312 (which may include, but are not limited to, one or more of the software applications described herein) configured to direct processor 1304 to perform any of the operations described herein may be stored within storage device 1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1308 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 600. For example, one or more applications 1312 residing within storage device 1306 may be configured to direct processor 1304 to perform one or more processes or functions associated with communication facility 302, messaging facility 304, communication facility 402, delivery facility 404, load balancing facility 406, fault surveillance facility 408, and/or communication facility 502. Likewise, storage facility 306, storage facility 410, and/or storage facility 504 may be implemented by or within storage device 1306.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    receiving, by a message broker subsystem, a message intended for delivery to a recipient software application instance;
    querying, by the message broker subsystem, a global directory service subsystem to determine whether the recipient software application instance is registered with the global directory service subsystem;
    receiving, by the message broker subsystem and in response to the querying, an indication from the global directory service subsystem that the recipient software application instance is registered with the global directory service subsystem and that one or more other software application instances that are functionally equivalent to the recipient software application instance are also registered with the global directory service subsystem, the recipient software application instance and the one or more other software application instances forming a plurality of functionally equivalent software application instances registered with the global directory service subsystem;
    automatically selecting, by the message broker subsystem, based on the received indication, a software application instance from the plurality of software application instances for receipt of the message in accordance with a load balancing heuristic; and
    attempting, by the message broker subsystem, to deliver the message to the selected software application instance.

2. The method of claim 1, further comprising:
    successfully delivering, by the message broker subsystem, the message to the selected software application instance; and
    notifying, by the message broker subsystem, a software application that originated the message of the successful delivery.

3. The method of claim 1, further comprising:
    detecting, by the message broker subsystem, a failure to deliver the message to the selected software application instance;
    automatically selecting, by the message broker subsystem, another software application instance from the plurality of software application instances for receipt of the message in accordance with the load balancing heuristic; and attempting, by the message broker subsystem, to deliver the message to the selected another software application instance.

4. The method of claim 1, further comprising:
identifying, by the message broker subsystem, one or more software application instances included in the plurality of software application instances that are in a fault state; and
preventing, by the message broker subsystem, the identified one or more software application instances from being selected for receipt of the message in accordance with the load balancing heuristic.

5. The method of claim 1, further comprising:
receiving, by the message broker subsystem, an additional message intended for delivery to the recipient software application instance;
automatically selecting, by the message broker subsystem, another software application instance from the plurality of software application instances for receipt of the additional message in accordance with the load balancing heuristic; and
attempting, by the message broker subsystem, to deliver the additional message to the selected another software application instance.

6. The method of claim 1, further comprising:
detecting, by the message broker subsystem, a failure to deliver the message to the selected software application instance;
attempting, by the message broker subsystem, to deliver the message to each of a remaining number of software application instances included in the plurality of software application instances in accordance with the load balancing heuristic;
detecting, by the message broker subsystem, a failure to deliver the message to the remaining number of software application instances; and
notifying, by the message broker subsystem, a software application that originated the message of the failures to deliver the message.

7. The method of claim 1, wherein the load balancing heuristic comprises a round-robin load balancing heuristic.

8. The method of claim 1, wherein the plurality of software application instances are associated with a single message broker.

9. The method of claim 1, wherein each software application instance in the plurality of software application instances is associated with a distinct message broker included in a plurality of message brokers.

10. The method of claim 1, wherein the selected software application instance is the recipient software application instance.

11. The method of claim 1, wherein the selected software application instance is a software application instance other than the recipient application instance.

12. The method of claim 1, embodied as computer-executable instructions on at least one non-transitory computer-readable medium.

13. A method comprising:
receiving, by a message broker subsystem, a plurality of messages intended for delivery to a recipient software application instance;
querying, by the message broker subsystem, a global directory service subsystem to determine whether the recipient software application instance is registered with the global directory service subsystem;
receiving, by the message broker subsystem and in response to the querying, an indication from the global directory service subsystem that the recipient software application instance is registered with the global directory service subsystem and that one or more other software application instances that are functionally equivalent to the recipient software application instance are also registered with the global directory service subsystem, the recipient software application instance and the one or more other software application instances forming a plurality of functionally equivalent software application instances registered with the global directory service subsystem; and
selectively distributing, by the message broker subsystem and based on the received indication, the messages among the plurality of software application instances in accordance with a round-robin load balancing heuristic.

14. The method of claim 13, embodied as computer-executable instructions on at least one non-transitory computer-readable medium.

15. A system comprising:
a communication facility configured to receive a message intended for delivery to a recipient software application instance;
a load balancing facility communicatively coupled to the communication facility and configured to
query a global directory service subsystem to determine whether the recipient software application instance is registered with the global directory service subsystem;
receive, in response to the query, an indication from the global directory service subsystem that the recipient software application instance is registered with the global directory service subsystem and that one or more other software application instances that are functionally equivalent to the recipient software application instance are also registered with the global directory service subsystem, the recipient software application instance and the one or more other software application instances forming a plurality of functionally equivalent software application instances registered with the global directory service subsystem; and
automatically select, based on the received indication, a software application instance from the plurality of software application instances for receipt of the message in accordance with a load balancing heuristic; and
a delivery facility communicatively coupled to the load balancing facility and configured to attempt to deliver the message to the selected software application instance.

16. The system of claim 15, further comprising a fault surveillance facility communicatively coupled to the delivery facility and the load balancing facility and configured to:
detect a successful delivery of the message to the selected software application instance; and
notify a software application that originated the message of the successful delivery.

17. The system of claim 15, further comprising:
a fault surveillance facility communicatively coupled to the delivery facility and the load balancing facility and configured to detect a failure to deliver the message to the selected software application instance;
wherein the load balancing facility is further configured to automatically select, in response to the detection of the failure, another software application instance from the plurality of software application instances for receipt of the message in accordance with the load balancing heuristic; and wherein the delivery facility is further configured to attempt to deliver the message to the selected another software application instance.

18. The system of claim 15, further comprising a fault surveillance facility communicatively coupled to the delivery facility and the load balancing facility and configured to detect a failure to deliver the message to the selected software application instance and prevent the selected software application from being subsequently selected for receipt of the message in accordance with the load balancing heuristic.

19. The system of claim 15, wherein:

the communication facility is further configured to receive an additional message intended for delivery to the recipient software application instance;

the load balancing facility is further configured to automatically select another software application instance from the plurality of software application instances for receipt of the additional message in accordance with the load balancing heuristic; and the delivery facility is further configured to attempt to deliver the additional message to the selected another software application instance.

20. The system of claim 15, wherein the load balancing heuristic comprises a round-robin load balancing heuristic.

* * * * *